(12) United States Patent
Williamson et al.

(10) Patent No.: US 10,675,941 B2
(45) Date of Patent: Jun. 9, 2020

(54) AIR-CONDITIONER CONTROL

(71) Applicant: Dometic Sweden AB, Solna (SE)

(72) Inventors: Jarrod Williamson, Olinda (AU); Louis Liu, Zhuhai (CN); Braddon Slater, Wakeley (AU)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 16/078,464

(22) PCT Filed: Feb. 22, 2017

(86) PCT No.: PCT/AU2017/050154
§ 371 (c)(1),
(2) Date: Aug. 21, 2018

(87) PCT Pub. No.: WO2017/143394
PCT Pub. Date: Aug. 31, 2017

(65) Prior Publication Data
US 2019/0047353 A1 Feb. 14, 2019

(30) Foreign Application Priority Data

Feb. 22, 2016 (AU) .................. 2016900627

(51) Int. Cl.
*B60H 1/00* (2006.01)
*F24F 11/30* (2018.01)
(Continued)

(52) U.S. Cl.
CPC ..... *B60H 1/00507* (2013.01); *B60H 1/00364* (2013.01); *B60H 1/00828* (2013.01);
(Continued)

(58) Field of Classification Search
CPC ............ B60H 1/00364; B60H 1/00507; B60H 1/00828; B60H 1/00885; B60H 2001/006;
(Continued)

(56) References Cited

U.S. PATENT DOCUMENTS

| 964,146 A | 7/1910 | Clark |
| RE24,637 E | 4/1959 | Wulle |

(Continued)

FOREIGN PATENT DOCUMENTS

| AU | 367405 | 3/2016 |
| AU | 201612249 | 5/2016 |

(Continued)

OTHER PUBLICATIONS

Australian Patent Office, International Search Report and Written Opinion for PCT/AU2017/050154 dated Apr. 13, 2017.
(Continued)

*Primary Examiner* — Tyler J Lee
(74) *Attorney, Agent, or Firm* — Middleton Reutlinger

(57) ABSTRACT

The invention provides an air-conditioner for maintaining a temperature of a conditioned space at or near a set temperature. The air-conditioner comprises at least one rotating or reciprocating element adapted to rotate or reciprocate at a variable frequency. The variable frequency including one or more nuisance frequencies at which vibration or noise within the air-conditioner or the conditioned space causes a nuisance. A processor (30) programmed to control variation of the variable frequency in response to operational requirement. The processor is configured to operate the at least one rotating or reciprocating element so as to substantially exclude operation at the one or more nuisance frequencies.

16 Claims, 3 Drawing Sheets

(51) Int. Cl.
  *F24F 11/89* (2018.01)
  *F25B 49/02* (2006.01)
  *B60H 1/08* (2006.01)
  *F24F 13/24* (2006.01)
  *F24F 110/10* (2018.01)
  *F25B 1/02* (2006.01)

(52) U.S. Cl.
  CPC .......... *B60H 1/00885* (2013.01); *F24F 11/30* (2018.01); *F24F 11/89* (2018.01); *F24F 13/24* (2013.01); *F25B 49/025* (2013.01); *B60H 2001/006* (2013.01); *F24F 2110/10* (2018.01); *F25B 1/02* (2013.01); *F25B 2500/12* (2013.01); *F25B 2500/13* (2013.01); *F25B 2500/19* (2013.01); *F25B 2600/01* (2013.01); *F25B 2600/0253* (2013.01); *Y02B 30/741* (2013.01)

(58) Field of Classification Search
  CPC .. F24F 11/30; F24F 11/89; F24F 13/24; F24F 2110/10; F25B 1/02; F25B 2500/12; F25B 2500/13; F25B 2500/19; F25B 2600/01; F25B 2600/0253; F25B 49/025; Y02B 30/741
  See application file for complete search history.

(56) References Cited

U.S. PATENT DOCUMENTS

| | | | |
|---|---|---|---|
| 3,092,009 A | 6/1963 | Goettl | |
| 3,115,082 A | 12/1963 | Sanoff | |
| 3,528,359 A | 9/1970 | Robert et al. | |
| 3,680,468 A | 8/1972 | Schueler | |
| D226,381 S | 2/1973 | Harty | |
| 3,727,537 A | 4/1973 | Harty, Jr. | |
| 3,867,486 A | 2/1975 | Nagele | |
| 3,974,755 A | 8/1976 | Honmann | |
| 4,189,987 A | 2/1980 | Amberg et al. | |
| D257,637 S | 12/1980 | Armbruster | |
| 4,502,368 A | 3/1985 | Hempel | |
| 4,502,467 A | 3/1985 | Smith | |
| 4,550,648 A | 11/1985 | Eagle | |
| D284,025 S | 5/1986 | Armstrong | |
| 4,608,834 A | 9/1986 | Rummel | |
| 4,637,299 A | 1/1987 | Harding | |
| 4,641,502 A | 2/1987 | Aldrich et al. | |
| 4,665,804 A | 5/1987 | Miyasaka | |
| 4,672,818 A | 6/1987 | Roth | |
| 4,690,040 A | 9/1987 | Barnett | |
| 4,693,174 A | 9/1987 | Anderson | |
| 4,709,623 A | 12/1987 | Roth et al. | |
| D296,583 S | 7/1988 | Barradas | |
| 4,760,773 A | 8/1988 | Pezzulli | |
| D300,777 S | 4/1989 | Bales et al. | |
| D306,341 S | 2/1990 | Venmar et al. | |
| 5,056,262 A | 10/1991 | Schweiss et al. | |
| 5,176,570 A | 1/1993 | Liedl | |
| 5,203,178 A * | 4/1993 | Shyu | F04C 28/28 417/14 |
| D343,894 S | 2/1994 | Anderson | |
| 5,307,645 A | 5/1994 | Pannell | |
| 5,366,149 A | 11/1994 | Kline | |
| 5,403,183 A | 4/1995 | Andersson et al. | |
| D360,681 S | 7/1995 | Chopko | |
| 5,435,781 A | 7/1995 | Kitchens | |
| D367,524 S | 2/1996 | Waldschmidt et al. | |
| 5,494,244 A | 2/1996 | Walton | |
| 5,501,083 A * | 3/1996 | Kim | F25B 27/005 62/228.4 |
| 5,501,634 A | 3/1996 | Wilder | |
| 5,531,641 A | 7/1996 | Aldrich | |
| 5,556,335 A | 9/1996 | Holyoake | |
| 5,588,910 A | 12/1996 | Hutter et al. | |
| 5,632,156 A | 5/1997 | Takeo et al. | |
| 5,643,081 A | 7/1997 | Klein | |
| D391,632 S | 3/1998 | Thomas | |
| 5,727,998 A | 3/1998 | Krueger et al. | |
| 5,752,877 A | 5/1998 | Sun | |
| 5,765,383 A | 6/1998 | Inoue | |
| 5,771,704 A * | 6/1998 | Nakajima | F25B 49/025 62/228.4 |
| 5,791,156 A | 8/1998 | Strautman et al. | |
| 5,860,856 A | 1/1999 | Teich et al. | |
| 5,863,310 A | 1/1999 | Brown et al. | |
| 5,964,910 A | 10/1999 | Keele | |
| D424,184 S | 5/2000 | Chang-Kwon | |
| 6,066,041 A | 5/2000 | Hernandez et al. | |
| 6,073,456 A | 6/2000 | Kawai et al. | |
| 6,076,370 A | 6/2000 | Da Silva | |
| D428,480 S | 7/2000 | Flanagan | |
| 6,101,829 A | 8/2000 | Robinson | |
| 6,149,513 A | 11/2000 | Lyu | |
| D435,639 S | 12/2000 | Robert et al. | |
| 6,171,062 B1 | 1/2001 | Bucher et al. | |
| D437,396 S | 2/2001 | Flanagan | |
| 6,196,914 B1 | 3/2001 | Lyu | |
| 6,220,045 B1 | 4/2001 | Kim | |
| 6,234,893 B1 | 5/2001 | Meredith | |
| 6,241,794 B1 | 6/2001 | Jadran et al. | |
| 6,250,373 B1 | 6/2001 | Vecchi et al. | |
| 6,257,976 B1 | 7/2001 | Richardson, III | |
| 6,302,780 B1 | 10/2001 | Ahn et al. | |
| 6,339,934 B1 | 1/2002 | Yoon et al. | |
| D454,625 S | 3/2002 | Flanagan | |
| 6,351,957 B2 | 3/2002 | Hara | |
| 6,367,270 B2 | 4/2002 | Niimi et al. | |
| 6,370,899 B1 | 4/2002 | Hobbs et al. | |
| 6,370,906 B1 | 4/2002 | Kuo | |
| 6,415,622 B2 | 7/2002 | Kim et al. | |
| 6,536,222 B1 | 3/2003 | Ahn et al. | |
| 6,554,880 B1 | 4/2003 | Northcutt | |
| 6,571,572 B2 | 6/2003 | Hobbs et al. | |
| 6,601,356 B2 | 8/2003 | Snyder | |
| 6,616,523 B1 | 9/2003 | Tani et al. | |
| 6,626,003 B1 | 9/2003 | Kortum et al. | |
| 6,745,586 B1 | 6/2004 | Reimann et al. | |
| D495,041 S | 8/2004 | Thomas | |
| 6,814,660 B1 | 11/2004 | Cavett | |
| 6,857,953 B2 | 2/2005 | Malott | |
| 6,889,762 B2 | 5/2005 | Zeigler et al. | |
| 7,086,740 B2 | 8/2006 | Sample et al. | |
| 7,140,192 B2 | 11/2006 | Allen et al. | |
| 7,171,822 B2 | 2/2007 | Allen et al. | |
| D538,413 S | 3/2007 | Lyu et al. | |
| 7,201,010 B2 | 4/2007 | Homan et al. | |
| D541,917 S | 5/2007 | Pfeiffer | |
| 7,234,315 B2 | 6/2007 | Allen et al. | |
| 7,237,397 B2 | 7/2007 | Allen | |
| D554,544 S | 11/2007 | Englert | |
| D560,785 S | 1/2008 | Galeazzi | |
| 7,316,119 B2 | 1/2008 | Allen | |
| 7,334,834 B2 | 2/2008 | Hill et al. | |
| 7,441,414 B2 | 10/2008 | Zeihr et al. | |
| 7,448,227 B2 | 11/2008 | Zeigler et al. | |
| 7,454,922 B2 | 11/2008 | Zeigler et al. | |
| 7,468,588 B2 * | 12/2008 | Yoo | F04B 35/045 318/114 |
| 7,591,143 B2 | 9/2009 | Zeigler et al. | |
| 7,591,303 B2 | 9/2009 | Zeigler et al. | |
| D619,151 S | 7/2010 | Tsuji | |
| 7,797,958 B2 | 9/2010 | Alston et al. | |
| 7,832,221 B2 | 11/2010 | Wijaya et al. | |
| D629,094 S | 12/2010 | Thomas | |
| 7,845,187 B2 | 12/2010 | Patel et al. | |
| 7,934,387 B2 | 5/2011 | Lee et al. | |
| 7,963,117 B2 | 6/2011 | Allen et al. | |
| 8,015,833 B2 | 9/2011 | Cikanek et al. | |
| 8,096,482 B2 | 1/2012 | Dage | |
| 8,171,866 B2 | 5/2012 | Dunstan | |
| D661,386 S | 6/2012 | Bergin | |
| 8,249,749 B2 | 8/2012 | Dage et al. | |
| D672,450 S | 12/2012 | Milks et al. | |

(56) References Cited

U.S. PATENT DOCUMENTS

| | | | |
|---|---|---|---|
| 8,453,722 | B2 | 6/2013 | Zeigler et al. |
| 8,504,209 | B2* | 8/2013 | Gross ................ G01N 29/4427 |
| | | | 324/166 |
| 8,535,127 | B2 | 9/2013 | Malott |
| 8,568,209 | B2 | 10/2013 | Boxum |
| D712,531 | S | 9/2014 | Bergin |
| D715,907 | S | 10/2014 | Bergin |
| D716,925 | S | 11/2014 | Bergin |
| 9,494,158 | B2* | 11/2016 | Pham ...................... F04B 39/06 |
| D782,939 | S | 4/2017 | Allard |
| 9,631,832 | B2 | 4/2017 | Malott |
| D785,771 | S | 5/2017 | Bergin et al. |
| D785,772 | S | 5/2017 | Bergin et al. |
| D811,566 | S | 2/2018 | Liu et al. |
| D850,609 | S | 6/2019 | Bergin |
| 2001/0053668 | A1 | 12/2001 | Berger |
| 2002/0094714 | A1 | 7/2002 | Matsuda et al. |
| 2003/0162492 | A1 | 8/2003 | Caferro et al. |
| 2003/0220070 | A1 | 11/2003 | Orendorff |
| 2004/0005854 | A1 | 1/2004 | Shin |
| 2004/0038643 | A1 | 2/2004 | Katagiri et al. |
| 2004/0072532 | A1 | 4/2004 | Cho |
| 2005/0087332 | A1 | 4/2005 | Umeo et al. |
| 2005/0227609 | A1 | 10/2005 | Koessler |
| 2006/0026936 | A1 | 2/2006 | Paumier et al. |
| 2006/0052050 | A1 | 3/2006 | Malott et al. |
| 2006/0083889 | A1 | 4/2006 | Schuckers |
| 2007/0000265 | A1 | 1/2007 | McEnaney et al. |
| 2007/0066215 | A1 | 3/2007 | Song et al. |
| 2007/0131408 | A1 | 6/2007 | Zeigler et al. |
| 2007/0156289 | A1* | 7/2007 | Altieri ...................... G01M 1/22 |
| | | | 700/280 |
| 2007/0157522 | A1 | 7/2007 | Hebert et al. |
| 2007/0227693 | A1 | 10/2007 | Allen et al. |
| 2007/0287374 | A1 | 12/2007 | Day et al. |
| 2007/0299560 | A1 | 12/2007 | LaHue et al. |
| 2008/0014852 | A1 | 1/2008 | Mielke et al. |
| 2008/0034767 | A1 | 2/2008 | Ziehr et al. |
| 2008/0146136 | A1 | 6/2008 | Degutis et al. |
| 2009/0098820 | A1 | 4/2009 | Yabu |
| 2010/0089563 | A1 | 4/2010 | Sundhar et al. |
| 2010/0224754 | A1 | 9/2010 | Khan et al. |
| 2011/0016894 | A1 | 1/2011 | Lemon et al. |
| 2011/0067420 | A1 | 3/2011 | Alston et al. |
| 2011/0146320 | A1* | 6/2011 | Tomiyama ........... B60H 1/3208 |
| | | | 62/296 |
| 2011/0302942 | A1 | 12/2011 | Birchard |
| 2012/0210733 | A1 | 8/2012 | Kolavennu et al. |
| 2012/0247131 | A1 | 10/2012 | Esch |
| 2012/0324927 | A1 | 12/2012 | Suzuki |
| 2013/0047648 | A1 | 2/2013 | Zeigler et al. |
| 2013/0109294 | A1 | 5/2013 | Tolinski et al. |
| 2013/0168064 | A1* | 7/2013 | Akiyoshi ............... F24F 1/0011 |
| | | | 165/121 |
| 2013/0205811 | A1 | 8/2013 | Esch |
| 2014/0033742 | A1 | 2/2014 | Esch |
| 2014/0188313 | A1 | 7/2014 | Huang |
| 2014/0223928 | A1 | 8/2014 | Esch |
| 2014/0260393 | A1 | 9/2014 | Siddiqui et al. |
| 2015/0087216 | A1 | 3/2015 | Stover et al. |
| 2015/0107814 | A1 | 4/2015 | Jeong |
| 2015/0251521 | A1 | 9/2015 | Brauer et al. |
| 2015/0352924 | A1 | 12/2015 | Allard et al. |
| 2016/0033185 | A1 | 2/2016 | Motokawa et al. |
| 2016/0076271 | A1 | 3/2016 | Reinking |
| 2016/0207372 | A1 | 7/2016 | Parry |
| 2019/0047354 | A1 | 2/2019 | Williamson et al. |

FOREIGN PATENT DOCUMENTS

| | | |
|---|---|---|
| AU | 201613590 | 7/2016 |
| AU | 201613591 | 7/2016 |
| AU | 201613592 | 7/2016 |
| AU | 201613593 | 7/2016 |
| AU | 201712794 | 5/2017 |
| AU | 201712798 | 5/2017 |
| AU | 2017222698 A1 | 8/2018 |
| AU | 2017222697 A1 | 9/2018 |
| CA | 1011592 A | 6/1977 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 202126056 U | 1/2012 |
| CN | 203533804 U | 4/2014 |
| CN | 204923367 U | 12/2015 |
| CN | 109070688 A | 12/2018 |
| DE | 112017000915 T5 | 10/2018 |
| EM | 003323740-0001 | 7/2016 |
| EM | 003421643-0001 | 10/2016 |
| EM | 003479179-0001 | 11/2016 |
| EM | 003479179-0002 | 11/2016 |
| EP | 0180053 A2 | 5/1986 |
| EP | 0064769 B1 | 8/1986 |
| EP | 1681517 A1 | 7/2006 |
| EP | 1832452 A2 | 9/2007 |
| EP | 3411250 A1 | 12/2018 |
| FR | 2087220 A7 | 12/1971 |
| GB | 2297157 A | 7/1996 |
| JP | S52137854 A | 11/1977 |
| JP | H01224484 A | 9/1989 |
| JP | 2004125338 A | 4/2004 |
| JP | 2009225552 A | 10/2009 |
| JP | 2011038699 A | 2/2011 |
| KR | 20070060394 | 6/2007 |
| KR | 20080065198 A | 7/2008 |
| WO | 2004099681 A1 | 11/2004 |
| WO | 2014143181 A1 | 9/2014 |
| WO | 2015131235 A1 | 9/2015 |
| WO | 2015134185 A1 | 9/2015 |
| WO | 2017143393 A1 | 8/2017 |
| WO | 2017143394 AU | 8/2017 |

OTHER PUBLICATIONS

10-Minute Tech, Trailer Life, Jul. 1996, pp. 69-70 dated Jul. 1, 1996.

American RV Company, Dometic 459530 Duo Therm 13,500 BTU Brisk Air Conditioner High Efficiency Upper Unit Trailer Camper RV, Mar. 23, 2014 https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.

American RV Company, Dometic 541815 High Performance 13,500 BTU Air Conditioner Upper Unit CCC2 Required Electronics Pre-Installed Camper Trailer RV, http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.

American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV-Mar. 23, 2014.

American RV Company, Dometic 541916 High Performance 15,000 BTU Air Conditioner Upper Unit Single Zone LCD Thermostat Required Electronics Pre-Installed Camper Trailer RV, http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV.

American RV Company, Dometic 551816 High Performance 15,000 BTU Heat Pump for Comfort Control Center II Camper Trailer RV, http://www.americanrvcompany.com/Dometic-551816-High-Performance 15000-BTU-Heat-Pump-for-Comfort-Control-Center-II-Camper-Trailer-RV Mar. 23, 2014.

Boyang(Boyard), Rotary compressor KFA102Z220 for air conditioning, http://www.hvaccompressor.com/boyangboyard-rotary-compressor-kfa102z220-for-air-conditioning.

(56) References Cited

OTHER PUBLICATIONS

Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine Off; http://www.eberspacher.com/products/air-conditioning/cooltronic-truck-parking-coolers.html Jun. 23, 2015.
Indelb; Wo Oblo'; Sleeping Well Oblo; http://www.indelb.com/products/parking_air_cooler/sleeping_well/sw_oblo Apr. 1, 2016.
Samsung, 360 Cassette, All-round Cool, http://www.samsung.com/au/air-conditioning/fjm-air-conditioners/NJ050DHXEAXSA.html.
Truma, Aventa Comfort (Australia) Operating Instructions Installation Instructions, Oct. 21, 2013, pp. 1-16 [Retrieved from internet on Aug. 21, 2018], https://www.truma.com/downloadcenter/aventa_comfort_installation_aus.pdf.
Webasto: Rooftop air conditioning systems: Rooftop 3.5-9.9 kw; http://www.eberspacher.com/products/air-conditioning/cooltronic-truck-parking-coolers.html May 14, 2014.
Webasto; Truck parking cooler: Cool Top Vario 10 E; http://www.webasto.com/gb/markets-products/truck/air-conditioning/products/cool-top-vario/ Apr. 25, 2016.
Youtube; Viesa Kompressor; https://www.youtube.com/watch?v=SPK17XEvVLO May 22, 2012 https://www.google.com/?gws_rd=ssl#q=https://www.youtube.com/watch?v%3DSPK17XEvVLO&spf=1495819902591).
Extended European Search Report for EP Patent Application No. 17755646.1 dated Sep. 4, 2019.
Non-Final Office Action for Design U.S. Appl. No. 29/573,473 dated May 9, 2017.
Canadian Intellectual Property Office, Office Action for App. No. 167431 dated Oct. 8, 2016.
Notice of Allowance for Design U.S. Appl. No. 29/573,473 dated Oct. 16, 2017.
Notice of Allowance for Design U.S. Appl. No. 29/573,473 dated Jan. 12, 2018.
International Search Report and Written Opinion for for PCT Patent Application No. PCT/US2013/065458 dated Jan. 29, 2014.
International Search Report and Written Opinion for PCT Patent Application No. PCT/AU2017/050153 dated Apr. 19, 2017.
International Preliminary Report on Patentability for PCT Patent Application No. PCT/AU2017/050153 dated Aug. 28, 2018.
International Preliminary Report on Patentability for PCT/AU2017/050154 dated Aug. 28, 2018.
AU Provisional Patent Application No. 2016900617 entitled "Vehicle air conditioner" filed on Feb. 22, 2016.
AU Provisional Patent Application No. 2016900627 entitled "Air-Conditioner Control" filed on Feb. 22, 2016.
Australian Patent Application 2017200186 entitled "Parking Cooler" filed Jan. 11, 2017.
Canadian Patent Application 2,906,348 entitled "Modular Air Grill Assembly" as filed Sep. 14, 2015 (national stage entry date).
Chinese Patent Application 201710040123.1 entitled "Parking Cooler" filed Jan. 18, 2017.
European Design Patent Application No. 003300219 entitled "Air Shroud Assembly" filed Jul. 8, 2016.
European Patent Application 17152275.8 entitled "Parking Cooler" filed Jan. 19, 2017.
Design U.S. Appl. No. 29/552,019 entitled "Air Shroud Assembly" dated Jan. 19, 2016.
Design U.S. Appl. No. 29/581,176 entitled "Air-Conditioning Unit" dated Oct. 17, 2016.
Design U.S. Appl. No. 29/594,476 entitled "Shroud Assembly" filed Feb. 17, 2017.
Design U.S. Appl. No. 29/604,433 entitled "Air Conditioning Apparatus" filed May 17, 2017.
Utility U.S. Appl. No. 15/407,709 entitled "Parking Cooler" filed Jan. 17, 2017.

* cited by examiner

AIR-CONDITIONER CONTROL

This 371 National Stage Entry patent application claims priority to and benefit of, under 35 U.S.C. § 119(e), PCT application number PCT/AU2017/050154, filed Feb. 22, 2017, titled, "Air-Conditioner Control", which claims priority to Australian patent application AU 2016900627, filed Feb. 22, 2016, all of which is incorporated by reference herein.

FIELD OF THE INVENTION

The present embodiments relate to air conditioners, in particular to a new control system and method in relation to air-conditioners which reduces nuisances caused by vibration. The embodiments have particular application to air-conditioners in recreational vehicles, but is more broadly applicable to air-conditioning in general.

BACKGROUND OF THE INVENTION

Many modern air-conditioners use inverter technology to control the speed of the compressor motor to drive a variable refrigerant flow. In this regard, traditional air-conditioners use a compressor which operates at a single speed and is switched on or off to control the temperature of the conditioned space. On the other hand, more modern air-conditioners use inverter technology having a variable frequency drive that controls the speed of the motor and thus the compressor and therefore the heating and cooling output of the air-conditioner.

Inverter technology has become common place due improved efficiency and smooth operation of air-conditioners with a reduction in costs of controlling electronics. However, because the compressor can now be operated over a wide range of frequencies, potential problems of noise and fatigue due to vibration may be exacerbated. While sources of vibration can be eliminated by damping or de-tuning equipment away from resonant frequencies with a compressor working at a constant speed, it can be difficult to identify all sources of vibration over a wide range of driving frequencies of the compressor of an inverter system. An analogous problem may occur with continuous control of fan speed, where a fan can be a source of vibration particularly in relation to annoying noises transmitted through cladding.

Vibration problems may be particularly difficult to overcome in situations where the mounting of the air-conditioner is in a wall or roof having relatively flexible construction. For example in a recreational vehicle, a roof mounted air conditioner can generate sympathetic resonant vibrations in the roof structure or other structural or cladding of the vehicle often located quite a distance from the air-conditioner. Noise from such vibrations can be particularly annoying to occupants and the resonant frequencies are beyond capability of prediction, occurring differently on a case-by-case basis depending on construction of the particular vehicle and its customization. Once an air-conditioner is installed, there may be little that the technician can do to solve the problem with prior art inverter air-conditioners.

It is an object of the present invention to overcome or ameliorate at least one of the disadvantages of the prior art, or to provide a useful alternative.

SUMMARY OF THE INVENTION

In accordance with a first broad aspect there is provided an air-conditioner for maintaining a temperature of a conditioned space at or near a set temperature, the air-conditioner comprising:

at least one rotating or reciprocating element adapted to rotate or reciprocate at a variable frequency, the variable frequency including one or more nuisance frequencies at which vibration or noise within the air-conditioner or the conditioned space causes a nuisance; and a processor programmed to control variation of the variable frequency in response to operational requirements;

wherein the processor is configured to operate the at least one rotating or reciprocating element so as to substantially exclude operation at the one or more nuisance frequencies.

In one embodiment, the at least one rotating or reciprocating element comprises a variable frequency compressor supplying corresponding variable compressive power. The processor may comprise an adjustment capability allowing reconfiguring to substantially exclude operation at one or more of the nuisance frequencies that are identified after manufacture of the air-conditioner. The adjustment capability may allow reconfiguring to substantially exclude operation at one or more of the nuisance frequencies that are identified after installation of the air-conditioner.

In one embodiment, the processor is adapted to operate the at least one rotating or reciprocating element at a set of allowed frequencies which do not include any of the one or more nuisance frequencies and to cause transition between the allowed frequencies in response to the operational requirements. The transition may be a programmed gradual transition between the allowed frequencies over a transition time, avoiding operation at or within the nuisance frequencies for more than a maximum time during the transition. The maximum time may be less than 20 seconds, less than 10 seconds or less than 5 seconds.

In one embodiment, the processor is adapted:

to compute a target frequency for sustained operation according to the operational requirements;

to compute a revised target frequency by increasing or decreasing the target frequency if required to avoid the one or more nuisance frequencies; and to operate the at least one rotating reciprocating element at the revised target frequency.

The processor may be adapted to increase the target frequency if required to avoid the one or more nuisance frequencies if a rate of change of temperature difference from a temperature set point indicates more power is required, and to decrease the target frequency if required to avoid the one or more nuisance frequencies if the rate of change of temperature difference from a temperature set point indicates less power is required.

In one embodiment, the adjustment capability is provided by a capability of user to edit or add to a list of the one or more nuisance frequencies stored in a non-volatile memory.

In one embodiment, the processor comprises a nuisance frequency determination mode whereby the processor operates the rotating or reciprocating element at one or more specific frequencies to allow observation or measurement of whether the nuisance occurs during the operation at each of the one or more specific frequencies. When in the nuisance frequency determination mode, the processor may be further adapted to receive input by the user of the observation or measurement and to update the list of the one or more nuisance frequencies stored in the non-volatile memory.

In one embodiment, the at least one rotating reciprocating element comprises a rotating fan configured to supply conditioned air or to pass air over a heat exchanger.

In one embodiment, the air-conditioner is implemented on a recreational vehicle.

According to a second broad aspect there is provided a method of reducing a nuisance caused by an air-conditioner, the air-conditioner being adapted to maintain a temperature of a conditioned space at or near a set temperature, the air-conditioner comprising:

at least one rotating or reciprocating element adapted to rotate or reciprocate at a variable frequency, the variable frequency including one or more nuisance frequencies at which vibration or noise within the air-conditioner or the conditioned space causes the nuisance; and a processor programmed to control variation of the variable frequency in response to operational requirements;

the method comprising the step implemented in the programmed processor of operating the at least one rotating or reciprocating element so as to substantially exclude operation at the one or more nuisance frequencies.

DETAILED DESCRIPTION OF EMBODIMENTS

Figure 1A:
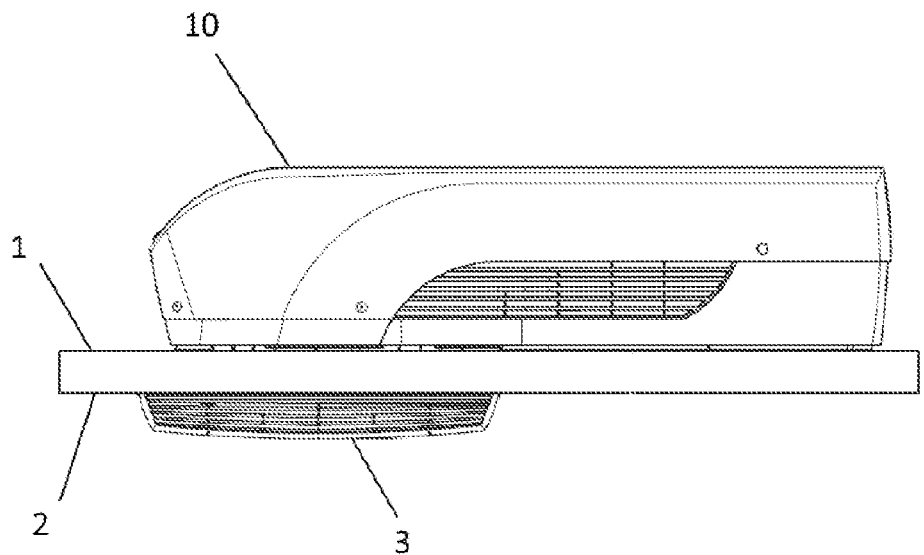
FIGS. 1A and 1B are cross-sectional views from two directions of a recreational vehicle air-conditioner having an external unit and an internal air distribution box and user interface.

Exemplary embodiments of the present invention will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 1B:
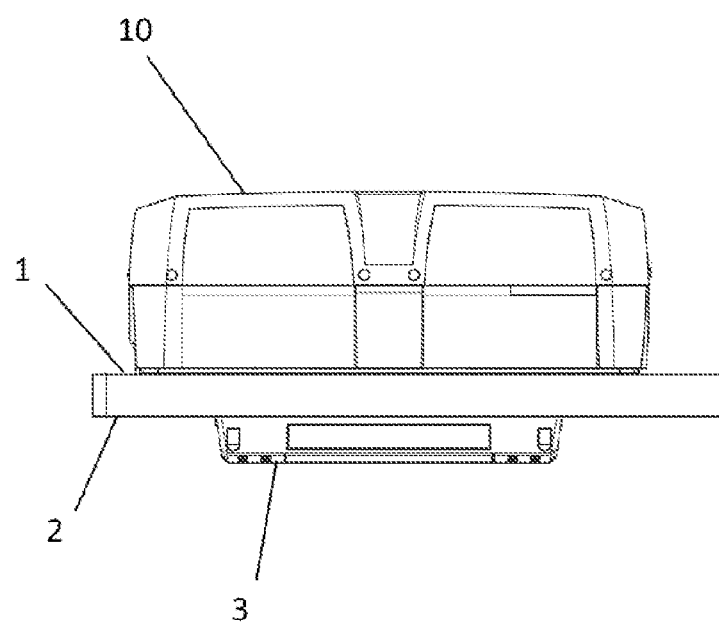

Referring initially to FIGS. 1A and 1B showing side and end cross sectional views respectively, a typical air-conditioner system to which the invention is applied comprises an external rooftop unit 10 housing a compressor, heat exchangers and fans installed above an aperture in a roof 1 of a recreational vehicle, exchanging return and supply air through internal componentry 3 attached to 2 ceiling 2, the internal componentry 3 comprising an air distribution box and user communications interface.

Figure 2:
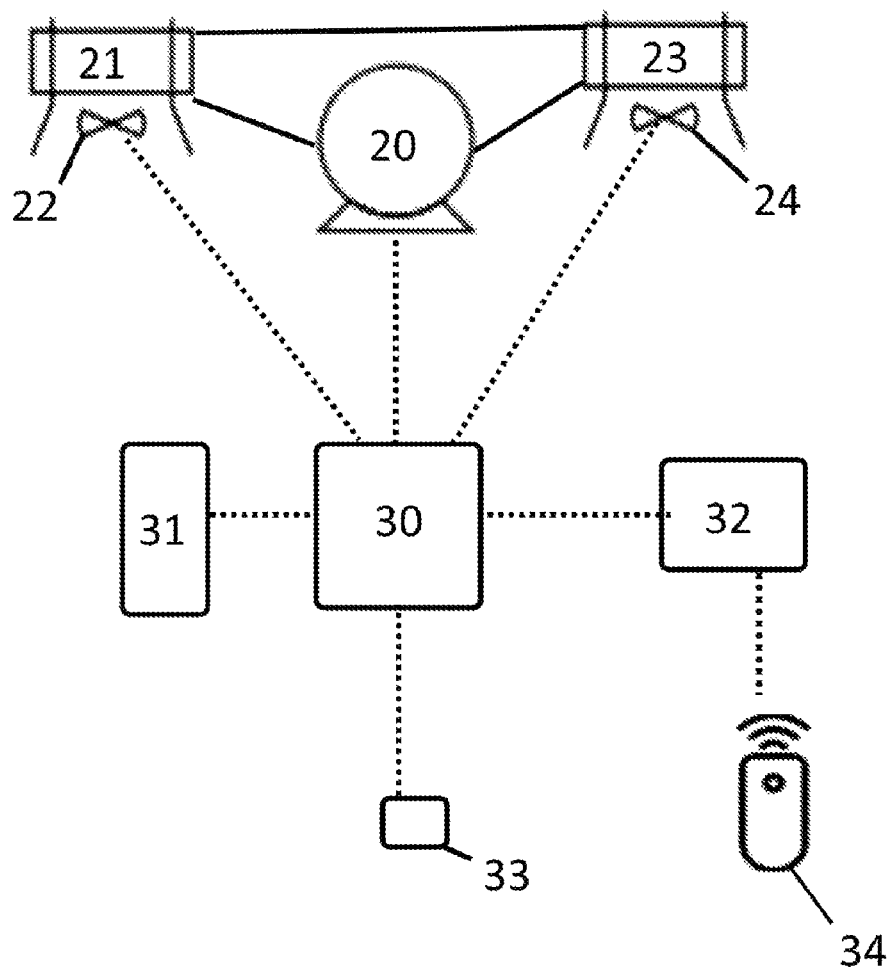
FIG. 2 is a functional block diagram of the air-conditioner FIG. 1 showing control elements according to an embodiment of the current invention.

Referring now to FIG. 2, a functional block diagram is shown where dotted lines indicate communication or control connection. The air-conditioner comprises principal components of compressor 20, external air heat exchanger 21 and fan 22, conditioned air heat exchanger 23 and fan 24, system processor 30, non-volatile memory 31, and conditioned space temperature sensor 33, and user communications interface 32. Compressor 20 pumps heat between heat exchanger 21 and 23 in one or both directions to provide the heat transfer between an external air blowing by external air fan 22 and conditioned air communicating with an internal space by conditioned air fan 24. As is known in the art, compressor 20 (for example Boyard KFA-102Z220) is driven by an AC motor controlled by a frequency control system to vary the speed (or frequency of rotation) of the compressor 20 motor. System processor 30 is typically based on a microprocessor and is responsible among other functions for sending commands to a frequency control system of compressor 20 to control the frequency of the compressor 20 in response to air-conditioner demand in order to maintain a desired temperature set point, having regard also to other parameters such as maximising performance or efficiency. The temperature set point is typically selected by an internal occupant through user communications interface 32 communicating with a hand-held remote control 34. Nuisances may be caused by vibrations occurring as a result of operation of the moving components compressor 20, external air fan 22, or conditioned air fan 24 or a combination thereof. Noise or vibrations may occur within the unit or outside the unit as described above.

As is known in the art, system processor 30 will increase or decrease the frequency of the compressor and hence the power output of the air-conditioner in step with a difference of the internal air temperature measured through the temperature sensor 33 and the set point. Typically, the greater the difference between the measured temperature and the set point, the greater the desired power and therefore the frequency of the compressor 20.

According to the invention, system processor 30 is programmed to substantially exclude operation at one or more compressor frequencies which produce a vibration nuisance. The system processor is also programmed to substantially exclude operation at one or more rotational frequencies of the external air fan 22, or conditioned air fan 24. These frequencies hereinafter shall be called nuisance frequencies.

The nuisance frequencies within the air-conditioner itself may be determined by the manufacturer in the design phase. One method of determining nuisance frequencies within the air-conditioner itself is to run the compressor 20 and/or the external air fan 22 or the conditioned air fan 24, over a range of frequencies from a minimum to a maximum in small increments such as 1 Hz, dwelling for a sufficient period at each frequency (such as 10 to 20 seconds or more) and measuring for excessive vibration or noise. The measurement may be made by a vibration sensor, microphone or combination of the two, or by human operator observation. While one obvious source of a nuisance frequency is a frequency of resonance of the refrigerant tubes attached to the compressor, typically at a low frequency around 30-35 Hz, there can be other higher frequencies containing islands of nuisance frequencies which cause vibrations or noise in other parts of the air-conditioner.

Nuisance frequencies occurring in an end customer installation can be determined in situ by similarly running the compressor 20 and/or the external air fan 22 or the conditioned air fan 24, over a range of frequencies as described above in the installed environment and measuring or listening for excessive or annoying vibration or noise emanating from anywhere in the installed environment. In the recreational vehicle application, nuisance frequencies may be determined in a test installation in a new model of recreational vehicle before market release, or may be determined after market after installation for an end customer by a technician or by the end customer when individual problems arise.

In this embodiment, system processor 30 may be switched by an operator (which may be a technician or an end customer) into a nuisance frequency determination mode which implements the above incremental scan in steps between a minimum and maximum. Identified nuisance frequencies may conveniently be recorded in the non-volatile memory 31 by the operator over the communications interface 32 such as by pressing a "select" button on the remote control 34 when a nuisance is noted during the scan. There may be a range of adjacent scanned frequencies over which a nuisance remains, in which case each of the adjacent scanned frequencies representing a forbidden band is recorded as a nuisance frequency together representing a forbidden band of nuisance frequencies (for example 65 Hz, 66 Hz, 67 Hz if the step size between tested frequencies is 1 Hz).

In simpler embodiments, system processor 30 may be switched into a manual mode allowing the technician or end customer to manually increase and decrease the compressor and/or the external air fan 22 or conditioned air fan 24, frequencies to note down the identified nuisance frequency or frequencies from a display or other communication of the current compressor frequency.

With one or more nuisance frequencies identified, in this embodiment system processor 30 may be configured or reconfigured, by reprogramming or data table adjustment, to avoid sustained operation at the nuisance frequencies during operation, or at newly identified nuisance frequencies particularly in the case of end customer problems. Reconfiguration may occur automatically when the user presses the select button as described above and the system adds the current frequency to the list of nuisance frequencies stored in the non-volatile memory.

Figure 3:
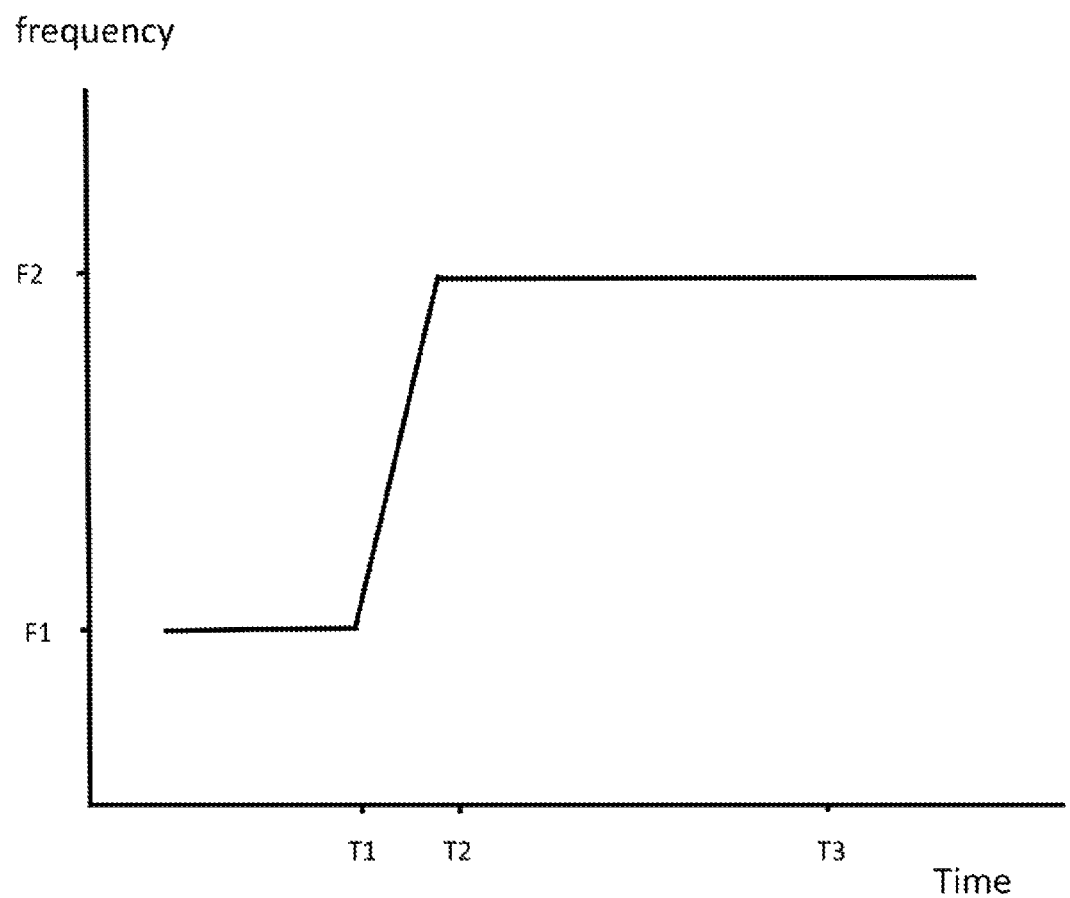
FIG. 3 is a graph of frequency versus time illustrating a control scenario according to an embodiment of the current invention in conjunction with the accompanying description.

Referring now to FIG. 3, there is shown a graph of frequency versus time in an example of operation of the system. In this example, the system processor has been operating the compressor at frequency F1 for a sustained period before time T1 and then at time T1 the system processor takes a measurement of the actual temperature of the conditioned space and calculates the difference $\Delta T$ between the actual temperature and the set point. In the case where the difference $\Delta T$ has increased compared to a previous time point, an appropriate response of the system processor may be to increase the cooling output and therefore the speed of the compressor to a higher allowed target frequency F2. The transition from F1 to F2 is effected by commands to the frequency control system of compressor 20 bringing about a gradual increase from F1 to F2 (for example 1 Hz per second increase). At time T2, higher frequency F2 is reached. After a predetermined interval of sustained operation (such as 2 minutes after T2), at time T3 a further measurement of $\Delta T$ is made, and a programmed decision made whether to adjust the target frequency further. In this example the decision is made to stay at frequency F2 for a further predetermined interval (such as two minutes after T3). Persons skilled in the art will understand that many and varied control algorithms are known to control temperature around the set point by periodically testing the temperature difference $\Delta T$ and adjusting the response in terms of selecting a target frequency at which to operate the compressor. Some such control algorithms are adaptive self-learning algorithms, and some are non-adaptive with fixed parameters. Typically, there is a programmed relationship where target frequency increases with temperature difference T. The programmed relationship may vary depending on whether the temperature difference $\Delta T$ is increasing or decreasing in order to avoid hunting or overshoot. Further, the programmed relationship may vary depending on other operational requirements such as different modes selected by the user as are known in the art to optimise for economy, power or quiet operation.

In the invention, the processor is programmed to substantially exclude operation at any of the one or more nuisance frequencies. While it is inevitable that a nuisance frequency may be briefly visited while the compressor speed is being ramped up from a frequency lower than a nuisance frequency to a target frequency higher than a nuisance frequency, such as in the example above if a nuisance frequency lies between F1 and F2, the invention avoids the system processor from dwelling at the nuisance frequency for any substantial amount of time and causing significant sustained nuisance. Periods of brief visitation are usually able to be restricted to one second or less, but maximum times of five seconds 10 seconds or 20 seconds are allowable if the circumstances dictate.

Avoidance of the nuisance frequencies may be achieved in a number of ways.

EXAMPLE 1

In one embodiment, a discrete set of allowable frequencies F1, F2 . . . FN is used for sustained operation between decision times, the allowable frequencies having values which do not include any of the nuisance frequencies. The system processor 30 operates to control the frequency by transitioning between the allowable frequencies at the decision points such as T2 and T3 above. In this technique, one way of reconfiguring the system after installation is to edit the values of the allowed frequencies F1, F2 . . . FN held in non-volatile memory rather than to explicitly store a list of nuisance frequencies in non-volatile memory.

EXAMPLE 2

Another embodiment utilises a control algorithm which first computes a target frequency at decision points such as T2 and T3 above based on operational requirements without regard to the nuisance frequencies, and then to compute a revised target frequency by increasing or decreasing the target frequency if required to avoid one of the nuisance frequencies. The air-conditioner is then operated at the revised target frequency for the sustained period (typically two minutes in the example above) until the next decision point. Typically, the target frequency is revised by as small as possible an amount to avoid the nuisance frequencies, and in an appropriate direction. For example, if the rate of change of temperature difference $\Delta T$ indicates a widening gap and that more power is required, the appropriate revision may be an increase and conversely a decrease if the rate of change of temperature difference indicates a lessening gap.

By providing a system and method which is specifically designed to avoid sustained operation at nuisance frequencies, which in embodiments described above may involve reconfiguring after installation, an improved air-conditioning is provided with reduced nuisance from vibration or noise.

Persons skilled in the art will also appreciate that many variations may be made to the invention without departing from the scope of the invention, which is determined from the broadest scope and claims.

For example, while the description above is primarily concerned with operation of the compressor 20, analogous avoidance of nuisance frequencies caused by either fan 22 or 24 can be dealt with similarly and is within the scope of the invention.

In the claims, the term "substantially exclude operation at the one or more nuisance frequencies" encompasses operation which allows the transitory operation described above involved in a gradual transition from operation at one frequency to another.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited in the claims are not necessarily intended to be performed temporally in the sequence written, or to be performed without pause once started, unless the context requires it.

It is to be understood that, if any prior art publication is referred to herein, such reference does not constitute an admission that the publication forms a part of the common general knowledge in the art, in Australia or any other country.

The invention claimed is:

1. An air-conditioner for maintaining a temperature of a conditioned space at or near a set temperature, the air-conditioner comprising:
    at least one rotating or reciprocating element configured to rotate or reciprocate at a variable frequency, the variable frequency including one or more nuisance frequencies being frequencies at which vibration or noise within the air-conditioner or the conditioned space causes a nuisance; and
    a processor programmed to:
        during a nuisance frequency determination mode, receive input by a user of an observation or measurement and,
        control variation of the variable frequency in response to operational requirements, wherein the processor:
            computes a target frequency for sustained operation according to the operational requirements;
            computes a revised target frequency by increasing or decreasing the target frequency if required to avoid the one or more nuisance frequencies; and
            operates the at least one rotating or reciprocating element at the revised target frequency;
        wherein the processor is configured to increase the target frequency if required to avoid the one or more nuisance frequencies if a rate of change of temperature difference from a temperature set point indicates more power is required, and to decrease the target frequency if required to avoid the one or more nuisance frequencies if the rate of change of temperature difference from a temperature set point indicates less power is required;
        wherein the processor is configured to operate the at least one rotating or reciprocating element so as to substantially exclude operation at the one or more nuisance frequencies.

2. The air-conditioner of claim 1 wherein the at least one rotating or reciprocating element comprises a variable frequency compressor supplying corresponding variable compressive power.

3. The air-conditioner of claim 2 wherein the processor comprises an adjustment capability allowing reconfiguring to substantially exclude operation at one or more of the nuisance frequencies that are identified after manufacture of the air-conditioner.

4. The air-conditioner of claim 3 wherein the adjustment capability allows reconfiguring to substantially exclude operation at the one or more nuisance frequencies that are identified after installation of the air-conditioner.

5. The air-conditioner of claim 4 wherein the processor is configured to operate the variable frequency compressor.

6. The air-conditioner of claim 1 wherein an adjustment capability is provided by a capability of user to edit or add to a list of the one or more nuisance frequencies stored in a non-volatile memory.

7. The air-conditioner of claim 6 wherein the processor comprises the nuisance frequency determination mode whereby the processor operates the rotating or reciprocating element at one or more specific frequencies to allow observation or measurement of whether the nuisance occurs during the operation at each of the one or more specific frequencies.

8. The air-conditioner of claim 6 wherein: in the nuisance frequency determination mode, the processor is further configured to update the list of the one or more nuisance frequencies stored in the non-volatile memory.

9. The air-conditioner of claim 1, wherein the processor is configured to operate the at least one rotating or reciprocating element at a set of allowed frequencies which do not include any of the one or more nuisance frequencies and to cause transition between the allowed frequencies in response to the operational requirements.

10. The air-conditioner of claim 9 wherein the transition is a programmed gradual transition between the allowed frequencies over a transition time, avoiding operation at or within the nuisance frequencies for more than a maximum time during the transition.

11. The air-conditioner of claim 10 wherein the maximum time is less than 20 seconds.

12. The air-conditioner of claim 11 wherein the maximum time is less than 10 seconds.

13. The air-conditioner of claim 12 wherein the maximum time is less than 5 seconds.

14. The air-conditioner of claim 1, wherein the at least one rotating or reciprocating element comprises a rotating fan configured to supply conditioned air or to pass air over a heat exchanger.

15. The air-conditioner of claim 1 wherein the air-conditioner is implemented on a recreational vehicle.

16. A method of reducing a nuisance caused by an air-conditioner, the air-conditioner being configured to maintain a temperature of a conditioned space at or near a set temperature, the air-conditioner comprising:
    rotating or reciprocating, by at least one rotating or reciprocating element, at a variable frequency, the variable frequency including one or more nuisance frequencies being frequencies at which vibration or noise within the air-conditioner or the conditioned space causes a nuisance; and
    identifying a nuisance frequency by a user or by a measurement during a nuisance frequency determination mode;
    controlling, by a processor, variation of the variable frequency in response to operational requirements;
    computing, by the processor, a target frequency for sustained operation according to the operational requirements;
    computing, by the processor, a revised target frequency by increasing or decreasing the target frequency if required to avoid the one or more nuisance frequencies; and
    operating the at least one rotating or reciprocating element at the revised target frequency;
    increasing the target frequency if required to avoid the one or more nuisance frequencies if a rate of change of temperature difference from a temperature set point indicates more power is required, and decreasing the target frequency if required to avoid the one or more nuisance frequencies if the rate of change of temperature difference from a temperature set point indicates less power is required;
operating the at least one rotating or reciprocating element so as to substantially exclude operation at the one or more nuisance frequencies.

\* \* \* \* \*